US010822505B2

(12) United States Patent
Kniess et al.

(10) Patent No.: US 10,822,505 B2
(45) Date of Patent: Nov. 3, 2020

(54) LASER-MARKABLE POLYMERS AND COATINGS

(71) Applicant: MERCK PATENT GMBH, Darmstadt (DE)

(72) Inventors: Helge Bettina Kniess, Rossdorf (DE); Ulrich Quittmann, Floersheim (DE); Silvia Rosenberger, Bodenheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 15/748,412

(22) PCT Filed: Jul. 13, 2016

(86) PCT No.: PCT/EP2016/001206
§ 371 (c)(1),
(2) Date: Jan. 29, 2018

(87) PCT Pub. No.: WO2017/016645
PCT Pub. Date: Feb. 2, 2017

(65) Prior Publication Data
US 2018/0223115 A1    Aug. 9, 2018

(30) Foreign Application Priority Data

Aug. 4, 2015  (DE) .................. 10 2015 009 854

(51) Int. Cl.

| | |
|---|---|
| *C08J 3/28* | (2006.01) |
| *C09D 7/62* | (2018.01) |
| *C09C 1/36* | (2006.01) |
| *C08K 9/02* | (2006.01) |
| *C08K 5/00* | (2006.01) |
| *C08K 7/18* | (2006.01) |
| *C08K 3/013* | (2018.01) |
| *C08K 3/22* | (2006.01) |
| *C09D 7/40* | (2018.01) |
| *C08J 3/20* | (2006.01) |
| *C08J 3/22* | (2006.01) |
| *C09D 5/03* | (2006.01) |
| *C09D 123/12* | (2006.01) |
| *C09D 133/12* | (2006.01) |
| *C09D 183/04* | (2006.01) |

(52) U.S. Cl.
CPC .............. *C09D 7/62* (2018.01); *C08J 3/203* (2013.01); *C08J 3/226* (2013.01); *C08K 3/013* (2018.01); *C08K 3/22* (2013.01); *C08K 5/0041* (2013.01); *C08K 7/18* (2013.01); *C08K 9/02* (2013.01); *C09C 1/3661* (2013.01); *C09D 5/031* (2013.01); *C09D 5/033* (2013.01); *C09D 7/67* (2018.01); *C09D 7/68* (2018.01); *C09D 7/69* (2018.01); *C09D 123/12* (2013.01); *C09D 133/12* (2013.01); *C09D 183/04* (2013.01); *C01P 2004/32* (2013.01); *C01P 2004/84* (2013.01); *C08J 3/28* (2013.01); *C08J 2323/12* (2013.01); *C08J 2333/12* (2013.01); *C08J 2483/04* (2013.01); *C08K 3/2279* (2013.01); *C08K 2003/2231* (2013.01); *C08K 2003/2241* (2013.01); *C08K 2201/005* (2013.01); *C09C 2210/60* (2013.01)

(58) Field of Classification Search
None
See application file for complete search history.

(56) References Cited

U.S. PATENT DOCUMENTS

| | | | | |
|---|---|---|---|---|
| 6,162,374 | A * | 12/2000 | Schoen ................... | C09D 5/24 252/511 |
| 2007/0173581 | A1 | 7/2007 | Hager et al. | |
| 2008/0026319 | A1* | 1/2008 | Stroh, III ................ | B41M 5/26 430/270.1 |
| 2010/0009171 | A1 | 1/2010 | Greb et al. | |
| 2012/0010345 | A1 | 1/2012 | Edler et al. | |
| 2015/0175803 | A1* | 6/2015 | Stoppelmann ....... | H05K 5/0247 428/35.7 |
| 2015/0203680 | A1* | 7/2015 | Motegi ................... | C08L 69/00 428/300.7 |
| 2020/0148849 | A1* | 5/2020 | Jung ....................... | C08K 3/22 |

FOREIGN PATENT DOCUMENTS

| | | | |
|---|---|---|---|
| CN | 1925990 A | 3/2007 | |
| CN | 101610894 A | 12/2009 | |
| CN | 102356131 A | 2/2012 | |
| DE | 102013007750 A1 | 5/2013 | |
| DE | 102013007750 A1 * | 11/2014 | ............... C08K 3/22 |
| EP | 1377522 A2 | 1/2004 | |
| JP | 10-244745 | 9/1998 | |
| JP | 2004-292765 | 10/2004 | |
| WO | 2014042283 A1 | 3/2014 | |

OTHER PUBLICATIONS

International Search Report PCT/EP2016/001206 dated Sep. 21, 2016.
Notification of first Office Action in corresponding CN application 201680043629.1 dated Oct. 25, 2019 (pp. 1-8) English.
Office Action in corresponding JP application 2 0 1 8—5 0 4 2 1 6 dated Jul. 2, 2020 (pp. 1-3) and English translation of same (pp. 1-4).

\* cited by examiner

*Primary Examiner* — Richard A Huhn
(74) *Attorney, Agent, or Firm* — Millen White Zelano and Branigan, PC; John Sopp

(57) ABSTRACT

The present invention relates to laser-markable polymers and coatings which are distinguished by the fact that they comprise tin/antimony oxide-coated spherical TiO$_2$ particles of defined particle size as laser additive.

9 Claims, No Drawings

LASER-MARKABLE POLYMERS AND COATINGS

The present invention relates to laser-markable polymers and coatings which are distinguished by the fact that they comprise tin/antimony oxide-coated spherical $TiO_2$ particles of defined particle size as laser additive.

The labelling of manufactured goods is becoming increasingly important in virtually all branches of industry. Thus, for example, dates of manufacture, batch numbers, expiry dates, barcodes, 2D codes, company logos and serial numbers frequently have to be applied to plastic parts. Of increasing importance in this connection is contactless, very rapid and flexible marking using lasers. Using this technology it is possible to apply inscriptions at high speed, even to a non-planar surface. Since the inscription is located within the plastic body or polymeric coating itself, it is permanently resistant to abrasion.

Since many plastics and polymeric coatings are transparent to laser light, laser-sensitive agents, which, as a result of absorption of the laser energy in the plastic material either directly as a result of interaction with the polymer or polymeric coating or indirectly with the added material, cause a local, highly visible discoloration, are usually added to the plastics and polymeric materials. The laser-sensitive agent can be an organic dye or a pigment which absorbs the laser light. Various causes may be given for the discoloration, for example, the decomposition of the polymer or the absorber itself is converted from an invisible form to a visible form. A darkening in the colour of the plastic generally occurs due to carbonisation as a consequence of the laser energy introduced.

Numerous laser additives (absorbers) are already known for the laser marking of plastics and polymeric materials. Suitable materials for marking using Nd-YAG lasers (neodymium-doped yttrium aluminium garnet lasers), $YVO_4$ lasers (yttrium vanadate lasers) and 1064 nm fibre lasers are preferably those which absorb light of wavelength 1064 nm and themselves have only a slight intrinsic colour. Examples are copper phosphates, bismuth oxide, bismuth oxychloride, antimony-doped tin oxide on mica or metals.

EP 1 377 522 A2 describes, for example, additives for the laser marking of plastics which consist of a calcined antimony/tin mixed oxide in which the antimony concentration at the surface is greater than that in the particles as a whole. The particle size is 0.1-10 µm, preferably 0.5-5 µm. With the additive, dark laser markings are obtained in the predominant number of the polymers. However, these additives have the disadvantage that they only exhibit a polymer-dependent marking and are thus very slow for the marking process.

It is problematic that laser markings can only visible with great difficulty on coloured or pale-coloured plastic parts. Examples of pale or coloured plastic parts are cable insulations, keyboards or coloured key caps, pipelines or casing materials. A dark, as far as possible black, inscription is desired here since this appears significantly higher in contrast than a grey marking against the coloured background. Dark markings can be produced by carbonisation of plastics by means of laser irradiation. However, this is limited to a few polymer types and usually leads to a change in the surface due to roughening. This causes, inter alia, a loss of mechanical strength in the case of thin layers and films.

There therefore continues to be a need for laser additives which lead, in particular on coloured substrates and in thin coatings or films as a result of laser bombardment, to a dark, polymer-independent, smooth and rapid marking which is durable and is retained over a long period, even under mechanical stress.

It is therefore an object of the present invention to find a process for the production of high-contrast and mechanically stable dark markings, in particular on white or coloured plastic articles or in white, pale or coloured coatings and films. A further object of the invention consists in the provision of a laser pigment or additive for laser marking which has only a slight intrinsic colour, or none at all, and, under the action of laser light, produces very good marking results in the polymer or polymeric coating doped therewith, in particular gives high-contrast and sharp dark markings and can be employed in a broad range of plastics.

It is a further object of the present invention to provide a process for the preparation of such a laser additive.

Surprisingly, it has been found that coloured plastic articles and polymer layers can be provided with dark markings by laser bombardment if the plastic or polymer comprises finely divided titanium dioxide having a tin/antimony oxide coating as laser additive. With the aid of the laser additive according to the invention, it is also possible to provide plastic articles or polymer layers that generally do not react with a laser additive with a dark marking by laser bombardment. These include, for example, silicone, which cannot exhibit carbonisation. However, polymers which otherwise react only very slowly to the laser light and can also only be carbonised with difficulty, such as, for example, PA, PE, PP, PMMA, POM, can also be marked rapidly and in high contrast with the aid of the additive according to the invention.

The invention therefore relates to laser-markable polymers and coatings, characterised in that they comprise spherical $TiO_2$ particles as laser pigment or additive, where the $TiO_2$ particles are coated on the surface with an antimony-doped tin dioxide layer $(Sn,Sb)O_2$ and the laser pigment has a number-weighted particle size of <15 µm, measured at the $D_{95}$ by means of laser diffraction. The antimony-doped tin dioxide layer $(Sn,Sb)O_2$ acts as absorber of the laser energy here. On laser bombardment, the $TiO_2$ of the laser additive is reduced to $Ti_xO_y$, which is distinguished by a dark colour.

Besides the chemical composition, the particle size distribution, in particular, is important for the action of the laser pigment according to the invention. The laser pigment has a very narrow particle size distribution, which, besides the dark marking, enables the edge sharpness to be increased compared with the prior art.

Furthermore, the particle size of the spherical $TiO_2$ particles can also influence the marking result. High-contrast dark markings having high edge sharpness are preferably obtained if the diameter of the $TiO_2$ spheres is 0.05-10 µm, preferably 0.1-2 µm and in particular 0.15-1 µm. Suitable $TiO_2$ particles are commercially available, for example under the trade names Kronos (Kronos) and Hombitec (Sachtleben).

Markings with high edge sharpness are obtained if the mass-weighted particle size of the pigments is 15 µm or less, preferably 10 µm or less and particularly preferably 4 µm or less, measured at the $D_{95}$ by means of laser diffraction.

Preferred additives according to the invention have a $D_{25}$ value of ≥0.05 µm, in particular 0.1 µm and very particularly preferably ≥0.15 µm.

The $D_{50}$ value of the additives according to the invention is preferably 0.05-10 µm, in particular 0.1-5 µm and very particularly preferably 0.15-1 µm.

The particle size of the laser additive is determined in this application by means of laser diffraction (Malvern Mastersizer 2000).

Particularly suitable laser additives are distinguished by the fact that they have a specific powder resistance of preferably <100 ohm*cm.

The specific powder resistance is determined in this patent application as follows. 1.5 g of additive are compressed between two metal rams with the aid of a 10 kg weight in an acrylic glass tube having a diameter d, and the electrical resistance R arising is measured. The specific powder resistance is obtained from the layer thickness L of the compressed additive (corresponds to the separation of the metal rams) in accordance with $$\rho = R \cdot \frac{\pi \cdot \left(\frac{d}{2}\right)^2}{L} [\Omega \cdot \text{cm}].$$

The spherical $TiO_2$ particles are coated on the surface with a tin dioxide layer which is doped with antimony. The doping is 0.1-60 mol %, preferably 1-40 mol %, in particular 2-30 mol %, based on the $SnO_2$.

The proportion of the $(Sn,Sb)O_2$ coating, based on the additive, is preferably 0.1-99% by weight, in particular 5-80% by weight and very particularly preferably 10-70% by weight.

Essential features for the suitability of the laser additive according to the invention are the pale inherent colour in plastic and coating applications.

The use concentration of the additive according to the invention for laser marking is 0.005-30%, preferably 0.015-20% and very particularly preferably 0.1-15%, based on the polymer or coating material to be marked. Owing to the low inherent colour of the additive, the colouristic properties of the plastic articles are impaired insignificantly or only to a small extent by the additive.

Under the action of laser light, the doped polymer exhibits a dark marking with high contrast and pronounced edge sharpness. The foaming which occurs in other processes for dark marking and the associated roughening of the surface is not observed.

Besides the excellent optical properties, contrast and edge sharpness, the laser additives according to the invention enable rapid markings with high pulse rates and have a large process window, based on the laser settings. In addition, the brightness of the marking can be controlled specifically down to very dark markings by adjustment of the laser parameters. Highly detailed coloured half-tone images are accessible merely via control of the laser parameters (power, exposure duration, focus). The invention likewise relates to the method for image generation.

The preparation of the additive according to the invention is relatively simple and can be carried out by processes known per se. The spherical $TiO_2$ particles are coated with an antimony-doped tin dioxide layer. The coating is preferably carried out by suspending the $TiO_2$ spheres in water and precipitating the metal oxides or metal oxide hydrates on at a suitable pH and converting the hydroxides or oxide hydrates into the metal oxides. In general, metal salts of antimony or tin, such as, for example, $SnCl_4$ or $SbCl_3$, in dissolved form are added to the aqueous suspension and are generally precipitated in the form of the metal oxide hydrates at a suitable pH. The metal oxide hydrates are subsequently converted into the corresponding oxides by treatment at elevated temperatures. The product obtained is filtered off, washed, dried, calcined and finally sieved.

The combination of titanium dioxide and the $(Sn,Sb)O_2$ layer has an advantageous effect in a number of respects. The $(Sn,Sb)O_2$ present causes significant absorption of the laser light, even in the case of very small particles. The laser additives according to the invention are consequently effective as additive for laser marking even in very low concentration. The very fine particle size favours the formation of a dark marking. The product according to the invention exhibits a narrow particle size distribution, good dispersibility, low abrasiveness, high brightness and transparency.

The laser additive can be introduced into the plastic or polymer analogously to standard industrial processes, for example as a dry pigment mixture, as a liquid preparation or paste or via a plastic- or wax-based concentrate, a so-called masterbatch. It is also possible to introduce the laser additive according to the invention by extrusion of a compound. This differs from the masterbatch in that it is employed without further dilution in the subsequent processing, since it already comprises the desired additives in the final concentration in the desired plastic. Besides the laser-active pigments, it is also possible to add colouring pigments and further additives during all said additive-addition processes.

In the advantageous embodiment, a masterbatch of the plastic having a relatively high concentration of the laser additive according to the invention is firstly prepared and this is then added in a small amount as granules to the main composition of the plastic during processing of the plastic.

Furthermore, colorants may be added to the polymers, allowing a broad colour variation, particularly in the colours red, green and blue. Suitable colorants are in particular organic pigments and dyes.

Polymeric materials which can be used for the laser marking are, in particular, all known plastics, in particular thermoplastics, furthermore thermosets and elastomers, which are described, for example, in Ullmann, Vol. 15, p. 457 ff., Verlag VCH. Suitable thermoplastic polymers are, for example, polyethylene, polypropylene, polyamides, polyesters, polyether esters, polyphenylene ethers, polyacetal, polybutylene terephthalate (PBT), polyethylene terephthalate (PET), polymethyl methacrylate, polyvinyl acetal, polystyrene, acrylonitrile-butadiene-styrene (ABS), acrylonitrile-styrene-acrylate (ASA), styrene-acrylonitrile (SAN), polycarbonate, polyether sulfones and polyether ketones, and their copolymers, mixtures, and/or polymer blends, such as, for example, PC/ABS, MABS.

Suitable thermosetting polymers are, for example, polyurethane, melamine resins, polyesters and epoxy resins.

The incorporation of the laser additive according to the invention can take place, for example, by compounding, via a masterbatch, via pastes or by direct addition during the shaping processing step (direct pigmentation). Further additives, such as process aids, stabilisers, flame retardants, fillers and colouring pigments, can optionally be added to the polymer, preferably plastic granules or powder, during the incorporation of the laser additive. The laboratory preparation of the doped plastic granules or powder is generally carried out by initially introducing the plastic granules in a suitable mixer, wetting them with dispersion aids and then adding and incorporating the laser additive and the coloured pigments required. In industrial practice, the colouring of and addition of additives to the polymer is usually carried out via a colour concentrate (masterbatch) or compound. For this purpose, coloured pigments and additives are dispersed in the molten plastic with high shear in extruders (usually co-rotating twin-screw extruders). The plastic melt exits through a perforated plate on the extruder head and is converted into granules by means of suitable downstream devices (for example strand pelletising processes or underwater granulation). The granules thus obtained can be further processed directly in an extruder or injection moulding machine. The mouldings formed during the processing exhibit very homogeneous distribution of the laser additive. Subsequently, the laser marking is carried out using a suitable laser.

In the case of coloured or white laser-markable polymers or plastics, the polymer or plastic comprises one or more colorants besides the laser additive according to the invention. Without a colorant, the plastic is transparent to opaque. Even without colorants, dark markings are obtained in the polymer in the presence of the laser additive according to the invention.

The concentration of the laser additive in the polymer, preferably thermoplastics, thermosets or elastomers, is generally dependent on the polymer material employed.

The use concentration of the additive according to the invention for laser marking is preferably 0.01-30%, in particular 0.015-20%, and very particularly preferably 0.1-15%, based on the plastic or coating. Owing to the pale inherent colour of the laser pigment according to the invention, the optical properties of the marked plastic or polymer are only impaired to a slight extent by the laser additive. The low proportion of laser additive changes the polymer system insignificantly and also does not influence its processability.

Under the action of laser light, the additive according to the invention exhibits a dark marking having high contrast and pronounced edge sharpness in the polymer. The foaming which occurs in other processes for dark marking, and the associated roughening of the surface, is not observed.

The invention also relates to a process for the preparation of the doped polymeric materials according to the invention, characterised in that a polymeric material is mixed with the laser additive according to the invention and then shaped under the action of heat.

The inscription of the polymer using the laser is carried out by bringing the specimen into the ray path of a pulsed laser, preferably an Nd:YAG laser. Furthermore, inscription using an excimer laser is possible. However, good to very good marking results are also possible using other conventional types of laser which have a wavelength in a region of high absorption or reactivity of the pigment used. The marking obtained is determined by the irradiation time (or pulse count in the case of pulsed lasers) and irradiation power of the laser and also by the plastic system used. The power of the laser used depends on the particular application and can readily be determined by the person skilled in the art on a case by case basis.

The laser used generally has a wavelength in the range from 157 nm to 10.6 μm, preferably in the range from 532 nm to 10.6 μm. Mention may be made here, for example, of $CO_2$ lasers (10.6 μm) and Nd:YAG lasers (1064 or 532 nm) or UV lasers. The excimer lasers have the following wavelengths: $F_2$ excimer laser (157 nm), ArF excimer laser (193 nm), KrCl excimer laser (222 nm), KrF excimer laser (248 nm), XeCl excimer laser (308 nm), XeF excimer laser (351 nm), frequency-multiplied Nd:YAG lasers having wavelengths of 355 nm (frequency-tripled) or 265 nm (frequency-quadrupled). Particular preference is given to using Nd:YAG lasers (1064 or 532 nm), fibre lasers (1060-1070 nm) or diode lasers (940-980 nm). The energy densities of the lasers used are generally in the range from 1 J/cm² to 2000 J/cm², preferably 10 J/cm² to 2000 J/cm². On use of pulsed lasers, the pulse frequency is generally in the range from 1 to 100 kHz. Corresponding lasers which can be used in the process according to the invention are commercially available.

The polymers and coatings doped in accordance with the invention can be used in all fields where conventional printing processes have hitherto been employed for inscription. For example, moulding compositions, semi-finished products and finished parts made from the polymer according to the invention can be used in the electrical, electronics and automotive industry. The labelling and inscription of, for example, cables, pipes, decorative strips or functional parts in the heating, ventilation and cooling sector or switches, plugs, levers and handles which consist of the polymer doped in accordance with the invention can be carried out with the aid of laser light even in places that are difficult to access.

Furthermore, the polymer system according to the invention can be used in packaging in the food sector or in the toy sector. The markings on the packaging are distinguished by the fact that they are wipe- and scratch-resistant, stable during subsequent sterilisation processes, and can be applied in a hygienically pure manner during the marking process. Complete label images can be applied permanently to the packaging for a reusable system. Furthermore, the polymer system according to the invention is used in medical technology, for example in the marking von Petri dishes, microtitre plates, catheters, disposable syringes, ampoules, sample containers, supply tubes and medical collecting bags or storage bags.

A further important area of application for laser inscription are plastic tags for the individual labelling of animals, so-called cattle tags or ear tags. A barcode system is used to store the information which specifically belongs to the animal. This can be read off as required with the aid of a scanner. The inscription has to be very durable since the ear tags sometimes remain on the animals for a number of years.

The laser marking of moulding compositions, semi-finished products and finished parts which consist of the polymer according to the invention is thus possible.

The examples below are intended to explain the invention, but without limiting it. The percentages indicated are percent by weight.

All $D_{25}$, $D_{50}$ and $D_{95}$ values in this application are determined by means of laser diffraction using the Malvern Mastersizer 2000 instrument.

EXAMPLES

Example 1

100 g of spherical $TiO_2$ (Kronos 2900, KRONOS Inc.) having a diameter $D_{95}$ of 700-900 nm (measured using a measuring instrument from Malvern Ltd., UK, Malvern 2000) are heated to 75° C. in 2 l of demineralised water with stirring. The pH of the suspension is adjusted to a value of 2.0 using 10% hydrochloric acid. A tin antimony chloride solution in hydrochloric acid, consisting of 264.5 g of 50% $SnCl_4$ solution, 60.4 g of 35% $SbCl_3$ solution ad and 440 g of 10% hydrochloric acid, is subsequently metered in slowly, during which the pH of the suspension is kept constant by simultaneous addition of 32% sodium hydroxide solution. When the addition is complete, the mixture is stirred for a further 15 min. The pH is subsequently adjusted to a value of 3.0 by addition of 32% sodium hydroxide solution, and the mixture is stirred for a further 30 min.

The product is filtered off, washed, dried, calcined at a temperature of 500-900° C. for 30 min. and sieved through a 100 μm sieve.

Use Examples

Example A1—Laser Marking of Plastics 1 kg of PP granules (Metocene 648T, Basell) are wetted with 2 g of dispersion aid (Process-Aid 24, Colormatrix) in a drum mixer. 3 g of the laser additive from Example 1, 1 g of organic yellow pigment (PV Fast Yellow HG, Clariant) and 0.25 g of green pigment (PV Fast Green GNX, Clariant) are added and incorporated for 2 min in the drum mixer. The resulting mixture is compounded in a co-rotating twin-screw extruder with high shear at a jacket temperature of 200-220° C., shaped through a pelletising die to give a strand, cooled in a water bath and granulated by means of a rotating knife. The compound obtained is converted into tiles having the dimensions 60 mm×90 mm×1.5 mm (w×h×d) on an injection moulding machine. The plastic tiles are then laser-marked using a pulsed YVO$_4$ laser having a wavelength of 1064 nm and a maximum output power of 10.5 W. The test grid varies the speed between 500 and 5000 mm/s and the frequency between 20 and 100 kHz. Filled areas with a line spacing of 50 μm and also line text are lasered. Stable dark laser markings are obtained up to a speed of 3000 mm/s. The line marking is very defined with accurate detail. The smooth surface of the marking confirms the reaction of the additive and less of the surrounding polymer.

Example A2—Laser Marking of Plastics 3 g of additive from Example 1 are incorporated into PMMA analogously to Example A1—instead of organic coloured pigments, 2 g of TiO$_2$ Kronos 2220 are used. The plastic tiles are subsequently laser-marked using a pulsed YVO$_4$ laser having a wavelength of 1064 nm and a maximum output power of 10.5 W. The test grid varies the speed between 500 and 5000 mm/s and the frequency between 20 and 100 kHz. Filled areas having a line separation of 50 μm and in addition line script are lasered. Stable dark laser markings are achieved up to a speed of 5000 mm/s, which corresponds to the maximum marking speed of the laser.

Example A3—Laser Marking of Silicone

Liquid silicone rubber (LSR) is a two-component system which easily polymerises under the action of heat. The two liquid components are mixed in the ratio 1:1 to give the silicone rubber. In the example, an LSR type: KEG 2000/50 from Shin-Etsu is used. 6 g of the laser additive from Example 1 are added to 500 g of component 1 of the LSR and mixed vigorously. 500 g of component 2 are subsequently added and again mixed vigorously. This liquid mixture is poured into a mould and placed in a laboratory oven at 180° C. for 20 minutes for curing. After curing, the moulding is allowed to cool and laser-marked analogously to Example A1.

Example A4—Laser Marking of Powder Coatings 560.5 g of Crylcoat 2689-0 (Allnex), 29.5 g of Primid XL-552 (Ems Chemie AG), 8.0 g of BYK 364P (BYK-Chemie GmbH), 2.0 g of Benzoin (DSM) and 400 g of Kronos 2160 (Kronos Titan GmbH) and 60 g of additive from Example 1 are mixed vigorously in a laboratory mixer for 5 min. The mixture obtained is extruded in a suitable extruder at temperatures between 70 and 100° C. The extrudate obtained is cooled, broken and ground. After addition of 2.0 g of Aeroxide Alu C (Evonik), the powder is sieved using a sieve, mesh width 125 μm. The powder coating material obtained is applied to test metal sheets by means of the corona or tribo method and baked at 180° C. (specimen temperature) for 10 min.

The coating on the test metal sheets is marked using an IR laser analogously to Example A1 and Example A2.

The invention claimed is:

1. A method for the production of darkened laser-markings on a laser-markable polymer or on a laser-markable polymeric coating, which comprises:

laser-treating the polymer or polymeric coating, which polymer or polymeric coating comprises a polymer and, in the polymer, a laser additive, which laser additive comprises spherical TiO$_2$ particles which are coated on the surface with an antimony-doped tin dioxide layer (Sn,Sb)O$_2$ and the TiO$_2$ particles have a number weighted particle size of <15 μm, measured at the D$_{95}$ by means of laser diffraction, and wherein, in the resulting polymer or polymeric coating, the laser-treating results in reducing the TiO$_2$ in the laser additive to Ti$_x$O$_y$, which results in a visibly darkened marking with a surface which is not roughened, where it was laser-treated.

2. The method of claim 1, wherein the content of antimony in the tin dioxide layer is 0.1-60 mol %, based on the tin dioxide.

3. The method of claim 1, wherein the laser additive has a number-weighted particle size of ≥0.05 μm, measured at the D$_{25}$ by means of laser diffraction.

4. The method of claim 1, wherein the laser additive is employed in a concentration of 0.005 to 30% by weight, based on the polymer or polymeric coating.

5. The method of claim 1, wherein the polymer is a thermoplastic, thermoset, elastomer or silicone.

6. The method of claim 1, wherein the polymer additionally comprises one or more coloured pigments and/or dyes.

7. The method of claim 1, wherein the content of antimony in the tin dioxide layer is 2-15 mol %, based on the tin dioxide.

8. A moulding composition, a product, a part or a film, which comprises a dark laser-marking on a polymer or polymeric coating thereof, which marking was produced by the method of claim 1.

9. A powder coating, which comprises a dark laser-marking thereon, which marking was produced by the method of claim 1.

* * * * *

UNITED STATES PATENT AND TRADEMARK OFFICE
CERTIFICATE OF CORRECTION

Page 1 of 1

PATENT NO. : 10,822,505 B2
APPLICATION NO. : 15/748412
DATED : November 3, 2020
INVENTOR(S) : Helge Kniess, Ulrich Quittmann and Silvia Rosenberger It is certified that error appears in the above-identified patent and that said Letters Patent is hereby corrected as shown below:

On the Title Page

Item (30) Foreign Application Priority Data reads:
"Aug. 4, 2015   (DE) ................ 10 2015 009 854"

Should read:
-- Jul. 28, 2015   (DE) ................ 10 2015 009 544.7
Aug. 4, 2015     (DE) ................ 10 2015 009 854.3 --

Signed and Sealed this
Eighth Day of June, 2021

Drew Hirshfeld
*Performing the Functions and Duties of the
Under Secretary of Commerce for Intellectual Property and
Director of the United States Patent and Trademark Office*